United States Patent [19]
Dunlap et al.

[11] 3,845,745
[45] Nov. 5, 1974

[54] WATER INJECTION SYSTEM FOR AN INTERNAL COMBUSTION ENGINE

[76] Inventors: Charles R. Dunlap; Harris D. Himes, both of 1746 Yorba Dr., Pomona, Calif. 91768

[22] Filed: July 3, 1972

[21] Appl. No.: 268,474

[52] U.S. Cl. ............................. 123/25 L, 123/25 J
[51] Int. Cl. ... F02b 47/02, F02d 19/00, F02d 19/12
[58] Field of Search ...... 123/25 L, 25 A, 25 B, 25 J

[56] References Cited
UNITED STATES PATENTS

| | | | |
|---|---|---|---|
| 1,727,197 | 9/1929 | Bryan et al. | 123/25.1 X |
| 1,901,618 | 3/1933 | Waters et al. | 123/25 L UX |
| 1,920,174 | 8/1933 | Harris | 123/25.3 X |
| 2,403,774 | 7/1946 | Whitty et al. | 123/25 A |
| 2,431,590 | 11/1947 | Smith | 123/25 L X |
| 2,471,012 | 5/1949 | Spaw | 123/25 A |
| 2,491,484 | 12/1949 | Dolza et al. | 123/25 L |
| 2,492,485 | 12/1949 | King | 123/25 L X |
| 2,495,231 | 1/1950 | Dickey | 123/25 L |
| 2,554,612 | 5/1951 | Bills et al. | 123/25 J |

FOREIGN PATENTS OR APPLICATIONS
156,003   4/1954   Australia............................ 123/25 X Primary Examiner—Charles J. Myhre
Assistant Examiner—Ira S. Lazarus
Attorney, Agent, or Firm—George J. Netter

[57] ABSTRACT

Water is pumped along a number of lines, one for each engine cylinder, to individual valving and nozzle means in the manifold wall located immediately adjacent the inlet valve of the respective cylinders or rotary chambers. The pumping means is controlled by manifold pressure to provide water in the outlet lines when manifold pressure exceeds a predetermined magnitude and in increasing amounts as the manifold pressure increases further. In another version, water feed lines are connected to valving and nozzle means received within a spacer plate mounted to the carburetor such that the water is injected directly into the fuel-air mixture and thereby supplied to all of the cylinders or rotary chambers, as the case may be. The water reservoir and pumping means are the same and control is maintained as in the first version.

3 Claims, 3 Drawing Figures

PATENTED NOV 5 1974
3,845,745
FIG. 1.
FIG. 2.
FIG. 3.
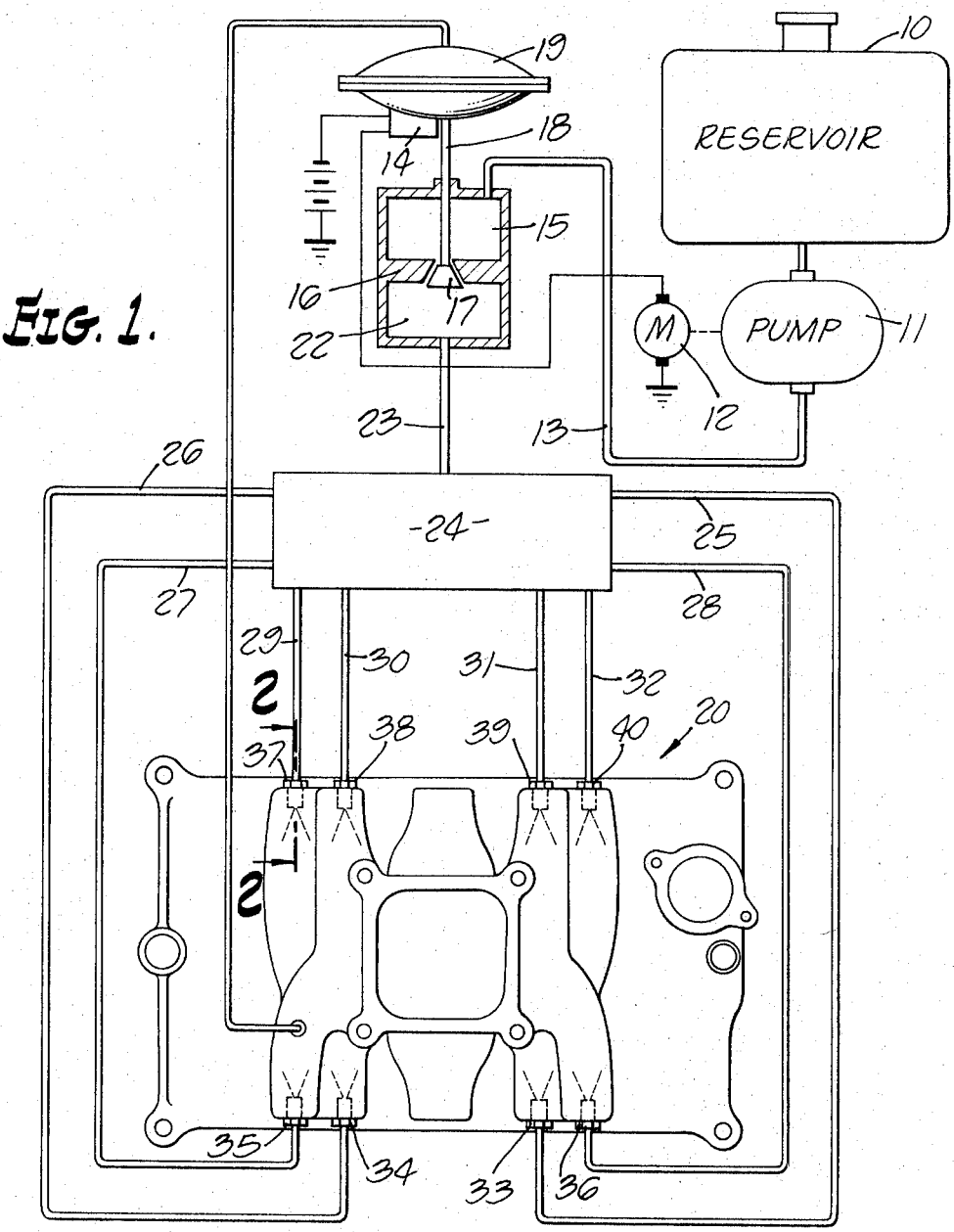
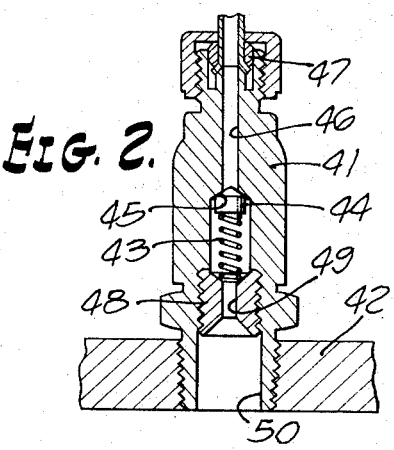
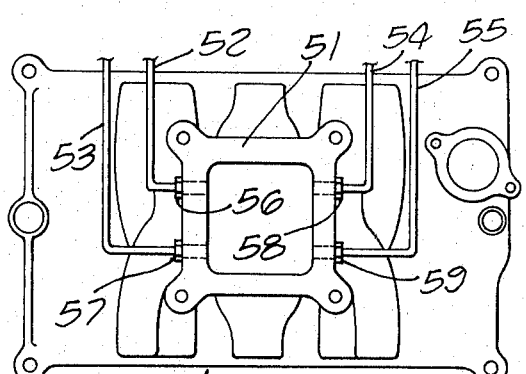

WATER INJECTION SYSTEM FOR AN INTERNAL COMBUSTION ENGINE

BACKGROUND OF THE INVENTION

The present invention relates generally to internal combustion engines, and, more particularly, to an improved system of injecting water into the fuel-air mixture of an internal combustion engine of either the reciprocating piston or rotary combustion chamber types.

It is known that the addition of controlled amounts of water to the fuel-air mixture of an internal combustion engine enhances its performance, increases operational life, produces greater fuel economy and reduces harmful emissions. The injection of water is fundamentally beneficial in that it reduces the combustion chamber temperature. If the combustion chamber temperature is too high, the fuel-air mixture may ignite spontaneously following normal ignition by a spark plug. This problem has worsened with the increase in compression ratios of the more powerful enginges. To overcome this, substances such as tetraethyl lead have been added to the gasoline to retard its combustability and thereby eliminate engine "knocking" or "pinging." Moreover, where richer fuel-air mixtures are used, the gasoline itself acts as a cooling agent. The inherent dangers of lead pollutants in engine exhaust are, of course, well known; and where richer fuels are used, the exhaust undesirably includes higher contents of carbon monoxide and unburned hydrocarbons.

Water in the fuel-air mixture absorbs heat as it changes from a liquid to a gas, thereby cooling the combustion chamber. When added in proper amounts, water can overcome the detonation problem without the use of lead additives, and also permits the fuel to be leaned out to a more efficient level. At the same time, horsepower will be increased due to increased engine efficiency and deposits of carbon and other materials on pistons, valves, spark plugs and the like are reduced. Since the engine operating temperature has been substantially decreased, wear will be accordingly lessened. Still further, compression ratios do not have to be reduced to permit use of non-leaded fuels.

One approach for accomplishing injection taken in the past, has been to provide individual metering devices for dispensing measured amounts of water directly into each cylinder. Such a system is relatively complex and expensive, and requires special access means formed in the head at each cylinder location.

In certain other known water injection systems, a supply of water is located above the engine such that water may be injected into the fuel-air mixture by virtue of a gravity head which is generally unsatisfactory due to the change in water pressure with altitude and car orientation, e.g., different between car climbing and descending a hill.

Still other systems use generator output sensing apparatus for controlling water injection which is deficient at least in that there are occasions where rapid acceleration is desired under heavy load (requiring water to cool the combustion chambers) and the generator increase would be so gradual as not to produce a water injection signal.

In still further systems, water injection is controlled by a mechanical linkage with the throttle. When accelerating and water injection is desired, it is accomplished as the throttle is opened. However, when the car speed levels off, the throttle control is relaxed to a point maintaining that speed, but at a point greater than that immediately prior to acceleration, which results in excessive water injection.

OBJECTS AND SUMMARY OF THE INVENTION

It is, therefore, a primary object of this invention to provide an improved water injection system for either reciprocating piston or rotary engines.

A further object is the provision of a water injection system in which water is added to the intake manifold at points immediately upstream of the engine intake valves.

A still further object is the provision of a water injection system as in the above objects in which release of the water is controlled by the manifold pressure.

Yet another object is the provision of pintle valves at the points of injection such that the water is only released when the fluid pressure exceeds a predetermined threshold.

A further object is the provision of a water injection system in which water is dispensed into the fuel-air mixture within the carburetor via a spacer plate.

Another object is the provision of an improved water injection system for an internal combustion engine enabling utilization of unleaded gasoline without sacrifice of engine horsepower and substantially reducing harmful emissions.

A still further object is the provision of a simplified water injection system that increases engine efficiency, improves fuel economy, reduces carbon deposits and the overall operation of which is such as to require a minimum in maintenance.

In accordance with the practice of one form of the present invention, water is pumped from a suitable reservoir along a number of outlet lines, one for each cylinder, to individual valving and nozzle means in the manifold wall located immediately upstream from the inlet valves of the respective cylinders or rotary chambers. The pumping means is controlled by manifold pressure to provide water in the outlet lines when manifold pressure exceeds a predetermined magnitude and in increasing amounts as the manifold pressure increases further.

In a further form of the invention water feed lines are connected to valving and nozzle means received within a spacer plate mounted between the carburetor and manifold such that the water is injected directly into the fuel-air mixture and thereby supplied to all of the cylinders of rotary chambers, as the case may be. The water reservoir and pumping means are the same and control is maintained as in the first form of the invention.

DESCRIPTION OF THE DRAWINGS

FIG. 1 is a schematic representation of one form of the system of this invention.

FIG. 2 is a sectional view of a dispensing valve and nozzle taken along line 2—2 of FIG. 1.

FIG. 3 is a plan view of a carburetor spacer plate used in a further form of the present invention.

DESCRIPTION OF PREFERRED EMBODIMENTS

With reference now to the drawings and particularly FIG. 1, a preferred form of the invention is shown in generally schematic representation. In particular, a reservoir 10 containing a supply of water for use in the injection system of this invention can be mounted under the hood of the automobile at any convenient location. An electric pump 11 pressurizes water received from the reservoir through pipe or tubing 12 for delivery along a further pipe or tubing 13 for a purpose and use to be more particularly described. It is advisable that the water used for injection be distilled in order to avoid the development of scale on the various feed lines as well as in the combustion chambers.

When manifold pressure reaches a prescribed value, an electrical circuit is completed through a switch 14 to the pump 11 and controls flow of pressurized water through the pipe or tubing 13, the other end of which is connected with an upper chamber 15 of a poppet valve 16. A valving member 17 is moved into and out of seating relationship within an opening in a central wall of the poppet valve 16 by an actuator arm 18, the latter being linked to a manifold pressure sensitive device 19. That is, a pressure sensitive device 19, such as those devices used on vacuum advance systems for automobile ignition distributors, is connected to the manifold of the internal combustion engine 20 via tubing 21, and, on a predetermined manifold pressure being reached, the actuator 18 moves the valving member 17 to the open condition enabling high pressure water to move from 15 into the chamber 22 and out along pipe or tubing 23. After the prescribed threshold manifold pressure is passed, the higher the pressure attained the greater the valving member 17 is opened, thereby allowing a correspondingly greater amount of water to pass therethrough.

Water from tubing 23 then enters a distribution chamber 24 having a single water inlet, and a plurality of separate outlet ports each of which is provided with an individual feed line 25–32. Water is only supplied when the boost pump 11 operates, which is only when manifold pressure is sufficient to trip microswitch 14. On well known hydraulic principles, with a certain fluid pressure being established in distribution chamber 24, this same pressure will be maintained in each feed line 26–32.

Each feed line 26–32 terminates in an individual pintle or pressure release valve 33–40, mounted in the engine manifold wall immediately upstream from each inlet valve of the cylinders or rotary combustion chamber. It is to be particularly noted that the lines or tubings 26–32 are all the same length in order that the same hydraulic path is provided for each cylinder, thereby avoiding undesirable inertial lag in provision of water to the more distantly located cylinders.

Reference is now made to FIG. 2 and the ensuing description of the pintle valve construction. As shown there, the nozzle includes a hollow, generally cylindrical body 41 that is threadedly received within an accommodating opening in the manifold wall 42. A coil spring 43 tends to urge a valve member 44 against a seat 45 to close a passageway 46 communicating with the associated water feed line. Conventional fitting 47 connects the feed line tubing 25 to the pintle valve body 41. A removable nozzle member 48 includes a restricting orifice 49 which opens outwardly into a diffusing region 50 which acts to insure ready conversion of emitted water into very fine droplets.

Pressurized water applied to the feed line 25 moves the valve member 44 away from its seat 45 producing a fine spray of water from orifice 49 and diffusing region 50. Reduction of pressure in the feed line allows the member 44 to return to the closed position terminating water spray into the engine manifold.

The size of the orifice 49 must be varied in accordance with the engine displacement volume as well as its compression ration, assuming the boost pump pressure to be held constant. Accordingly, the pintle valve is provided with a removable member 48 so that the pintle valve body may be standardized and accommodate members 48 having different sized orifices.

Ordinarily at low manifold pressures and temperatures, since detonation does not take place, water injection is not needed. Accordingly, as described, at low pressures the poppet valve 16 is in the closed position. It also may be desirable in order to decrease carbon monoxide in the exhaust gases, to inject small amounts of water even at very low manifold pressure. As soon as manifold temperatures and pressure rise, water is now added to the fuel-air mixture in the manifold upstream of the intake valves. In known manner, the water cools the fuel-air mixture and increases engine volumetric efficiency and, thereby, power output. In addition, the water serves to dissipate enough heat to retard detonation and thereby reduce the need for leaded fuel.

FIG. 3 depicts an alternate form of the invention in which a special spacer plate 51 is mounted directly onto the carburetor between the carburetor and manifold not requiring carburetor modification or the addition of any other components to the engine.

Feed lines or tubings 52–55 and pintle valves 56–59, which may be identical to tubings 25–32 and valves 33–40, are received within openings formed in the sidewalls of the spacer plate. Operation is the same as in the first described embodiment, except that the water is injected into the fuel-gas mixture at the carburetor base rather than directly into the manifold.

An important feature of the present invention is the utilization of pump 11 in order to obtain a constant and positive water pressure throughout the whole system. As has been noted before in the prior art gravity feed systems, maintenance of constant water pressure was not obtainable since the pressure could change radically, depending on the orientation of the car or with changes in elevation. In a system such as described herein, having a number of conduits, a relatively large pressure dissipation must be expected. Moreover, since it is important that the pintle valves produce a fine spray, any severe loss in pressure would result in one or more of the cylinders or rotary chambers not being provided with the correct amount of water. The pumping system described here insures water pressure maintenance necessary for satisfactory operation of the invention.

A further important aspect of the invention is controlling operation of water injection by manifold pressure. As has been pointed out above, such things as the mechanical throttle linkage techniques or systems operating on generator voltage output, or even certain other systems utilizing cylinder thermostats are not completely satisfactory. That is, these prior systems either call for water injection when it is not needed or signal for the injection of water when it is too late to aid the engine or protect it. Manifold pressure, on the other hand, is the true indicator for a water injection system, since its pressure has a direct functional relationship to the engine's operation. A diaphragm regulator, such as used in ignition systems, was selected as a preferred device 19, however, there are a number of other readily available apparatus for this purpose. As described, the regulator 19 achieves two basically important functions: (1) it commands water pump operation when needed, and (2) it provides direct control of the poppet valve 16 which supplies water to the system in a correspondingly appropriate amount.

The spacer plate version of this invention (FIG. 3) is easier and less expensive than the first form where individual injection is provided at the manifold adjacent each of the cylinders or rotary chambers. That is, the only basic modification of the engine is to insert a spacer plate between the carburetor and the manifold mounting. In the first version, although threaded openings are required in the manifold for receiving the pintle valves, this is a relatively minor modification which can be easily accomplished and provides equal amounts of water to each of the cylinders or rotary combustion chambers. In either version there is a continuous flow injection of water upstream of the intake valves which is advantageously different from those systems which inject directly into the combustion chamber.

In accordance with the practice of this invention, a water injection system is provided in which pressurized water is made substantially instantaneously available on command for injection into the engine combustion chambers. That is, by including pintle valves at the downstream end of the injection feed lines, on the pump being turned off the feed lines remain filled with water, while on subsequent initiation of pumping, water is substantially instantaneously injected via the pintle valves and nozzles into the combustion chambers. In this way there is no problem resulting from accumulation of air in the feed lines as, for example, could occur if these lines merely terminated in an orifice or injection nozzle.

As described in the preferred embodiment, the fluid for injection into the combustion chambers has been water and to date it is the liquid found to be most satisfactory for producing the desired cooling effect. It is contemplated, however, that other liquid materials may be found satisfactory for accomplishing the purposes of this invention and that therefore in referencing the use of water as the injection medium there is no intention to be limitative in this regard.

What is claimed is:

1. Water injection system for an internal combustion engine having a plurality of combustion chambers and a manifold via which a fuel-air mixture is conduited to said combustion chambers, comprising:
   a reservoir of distilled water;
   an electrically powered pump for providing pressurized water from said reservoir;
   a poppet valve having an inlet connected to receive the pressurized water from said pump and an outlet, said valve being actuatable to pass selectively variable amounts of pressurized water to its outlet;
   a plurality of pintle valve and nozzle means each located in the manifold closely adjacent an individual combustion chamber;
   individual feed line means interconnecting the poppet valve outlet and the pintle valve and nozzle means; and
   means responsive to manifold pressure for interconnecting electric power to said pump and for actuating said poppet valve on manifold pressure exceeding a predetermined threshold amount, said means responsive to manifold pressure including a diaphragm pressure regulator, rod means connected with said regulator and positioned in correspondence with the manifold pressure, and switch means operated by said rod interconnecting electric power to said pump.

2. Water injection system for an internal combustion engine having a plurality of combustion chambers and a manifold via which a fuel-air mixture is conduited to said combustion chambers, comprising:
   a reservoir of liquid;
   an electrically powered pump for providing pressurized liquid from said reservoir;
   valve means having an inlet connected to receive the pressurized liquid from said pump and an outlet, said valve means being actuatable to pass selectively variable amounts of pressurized water to its outlet;
   a plurality of spray and nozzle means each located in the manifold closely adjacent an individual combustion chamber;
   individual feed line means interconnecting the valve means outlet and the spray nozzle means; and
   means responsive to manifold pressure for interconnecting electric power to said pump for actuating said valve means on manifold pressure exceeding a predetermined threshold amount, said means responsive to pressure including a diaphragm pressure regulator, rod means connected with said regulator and positioned in correspondence with the manifold pressure, and switch means operated by said rod interconnecting electric power to said pump.

3. Water injection system as in claim 2, in which said feed line means are all of substantially the same length.

* * * * *